(12) United States Patent
Hottovy

(10) Patent No.: US 9,163,564 B2
(45) Date of Patent: Oct. 20, 2015

(54) METHOD AND SYSTEM FOR ENERGY GENERATION IN A CHEMICAL PLANT BY UTILIZING FLARE GAS

(75) Inventor: John D. Hottovy, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 1522 days.

(21) Appl. No.: 12/819,730

(22) Filed: Jun. 21, 2010

(65) Prior Publication Data

US 2011/0308482 A1    Dec. 22, 2011

(51) Int. Cl.
*F02C 9/40* (2006.01)
*F02C 3/28* (2006.01)
*F22B 1/18* (2006.01)

(52) U.S. Cl.
CPC ... *F02C 9/40* (2013.01); *F02C 3/28* (2013.01); *F22B 1/18* (2013.01); *F05D 2220/60* (2013.01)

(58) Field of Classification Search
USPC .......... 60/783, 39.12, 39.182, 39.19, 39.464; 422/131, 132, 182, 183; 431/2, 5; 123/3
See application file for complete search history.

(56) References Cited

U.S. PATENT DOCUMENTS

| | | |
|---|---|---|
| 4,093,029 A | 6/1978 | Weisz et al. |
| 4,211,863 A | 7/1980 | McDaniel et al. |
| 4,318,711 A | 3/1982 | Smith |
| 4,654,801 A | 3/1987 | Stewart et al. |
| 4,676,870 A | 6/1987 | Stewart et al. |
| 4,761,948 A | 8/1988 | Sood et al. |
| 4,833,878 A | 5/1989 | Sood et al. |
| 5,183,866 A | 2/1993 | Hottovy |
| 5,387,659 A | 2/1995 | Hottovy et al. |
| 5,469,699 A | 11/1995 | Daman |
| 5,565,175 A | 10/1996 | Hottovy et al. |
| 6,042,790 A | 3/2000 | Hottovy et al. |
| 6,051,631 A | 4/2000 | Hottovy |
| 6,114,501 A | 9/2000 | Hottovy et al. |
| 6,239,235 B1 | 5/2001 | Hottovy et al. |
| 6,239,300 B1 | 5/2001 | Stouffer et al. |
| 6,262,191 B1 | 7/2001 | Hottovy et al. |
| 6,301,927 B1 * | 10/2001 | Reddy ............................. 62/619 |
| 6,743,869 B2 | 6/2004 | Franklin et al. |
| 6,806,324 B2 | 10/2004 | Hottovy et al. |
| 6,815,511 B2 | 11/2004 | Verser et al. |
| 6,967,230 B2 | 11/2005 | Hottovy et al. |
| 7,005,485 B2 | 2/2006 | Burns et al. |

(Continued)

FOREIGN PATENT DOCUMENTS

| | | |
|---|---|---|
| DE | 2728826 | 8/1978 |
| EP | 1887198 | 2/2008 |

OTHER PUBLICATIONS

U.S. Appl. No. 12/204,566, filed Sep. 4, 2008, John D. Hottovy.

(Continued)

*Primary Examiner* — Phutthiwat Wongwian
*Assistant Examiner* — Arun Goyal
(74) *Attorney, Agent, or Firm* — Fletcher Yoder, PC

(57) ABSTRACT

The present techniques provide systems and methods for recovering energy from flare gases in chemical plants and refineries. The systems use an engine to burn a portion of gas diverted from the flare system. The engine may be a reciprocating engine, or a burner in a boiler system, among others. The power generated by burning the flare gas is then used to power an energy recovery device. The energy recovery device may be an electrical generator, a compressor, or a steam boiler, among others.

5 Claims, 7 Drawing Sheets

(56) References Cited

U.S. PATENT DOCUMENTS

| | | |
|---|---|---|
| 7,014,821 B2 | 3/2006 | Hottovy et al. |
| 7,015,289 B2 | 3/2006 | Hottovy et al. |
| 7,033,545 B2 | 4/2006 | Kufeld et al. |
| 7,037,980 B2 | 5/2006 | Stacy et al. |
| 7,109,290 B2 | 9/2006 | McElvain et al. |
| 7,122,916 B2 * | 10/2006 | Nguyen et al. ............... 307/57 |
| 7,179,426 B2 | 2/2007 | Hottovy et al. |
| 7,442,035 B2 * | 10/2008 | Duesel et al. .................. 431/5 |
| 7,517,947 B2 | 4/2009 | McElvain et al. |
| 7,524,904 B2 | 4/2009 | Verser et al. |
| 7,547,750 B2 | 6/2009 | McElvain et al. |
| 7,615,596 B2 | 11/2009 | Burns et al. |
| 7,645,841 B2 | 1/2010 | Shaw et al. |
| 7,736,597 B2 | 6/2010 | Hottovy et al. |
| 2003/0012705 A1 | 1/2003 | Hottovy et al. |
| 2003/0023010 A1 | 1/2003 | Hottovy et al. |
| 2003/0027944 A1 | 2/2003 | Hottovy et al. |
| 2003/0050409 A1 | 3/2003 | Hottovy et al. |
| 2003/0092856 A1 | 5/2003 | Hottovy et al. |
| 2004/0116625 A1 | 6/2004 | Hottovy et al. |
| 2004/0136881 A1 | 7/2004 | Verser et al. |
| 2004/0192860 A1 | 9/2004 | Hottovy et al. |
| 2005/0095176 A1 | 5/2005 | Hottovy |
| 2006/0063896 A1 | 3/2006 | McElvain et al. |
| 2006/0240368 A1 | 10/2006 | Duesel et al. |
| 2007/0079816 A1 * | 4/2007 | White et al. .................. 123/527 |
| 2007/0157614 A1 * | 7/2007 | Goldman .................. 60/641.15 |
| 2008/0210089 A1 * | 9/2008 | Tsangaris et al. .................. 95/90 |
| 2009/0326168 A1 | 12/2009 | Burns et al. |
| 2010/0056707 A1 | 3/2010 | Hottovy et al. |
| 2010/0056732 A1 | 3/2010 | McElvain et al. |
| 2010/0130704 A1 | 5/2010 | Hottovy et al. |

OTHER PUBLICATIONS

U.S. Appl. No. 12/785,333, filed May 21, 2010, John D. Hottovy.

Business Wire. "Honeywell Power Systems Delivers 40 Parallon 75 Turbogenerators to Western Canada in May" (http://findarticles.com/p/articles/mi_m0EIN/is_2000_June_13/ai_62704318/) Jun. 13, 2000.

Cogeneration Technologies. "Flare Gas Recovery" (http://www.cogeneration.net/Flare_Gas_Recovery.htm) Last visited Dec. 2007.

Giampaolo, The Gas Turbine Handbook: Principles and Practices, 2003, The Fairmont Press, p. 237.

Packman, Keith. "The Case for Waste to Energy: Utilizing Low-BTU Reciprocating Gas Engine Generators" (http://www.cumminspower.com/www/literature/technicalpapers/PT-6015-waste-to-energy-en.pdf) 2007.

Saskatchewan Eco-Network. "Cogeneration Improves Efficiency" (http://www.econet.sk.ca/solutions/energy/cogeneration.html). Last visited Dec. 2007.

Webster, et al., The Application of Has Conditioning Technology for Nox Reduction on Five Watertube Boilers, AFRC 2001 Joint International Conbustion Symposium, John Zink Company, LLC., 2001.

International Search Report for PCT/US2011/039695.

* cited by examiner

METHOD AND SYSTEM FOR ENERGY GENERATION IN A CHEMICAL PLANT BY UTILIZING FLARE GAS

BACKGROUND

The present techniques relate generally to improving the environmental impact of chemical plants. More particularly, the present techniques relate to a method and a system for generating energy by utilizing flare gas to power a reciprocating engine generator.

This section is intended to introduce the reader to aspects of art that may be related to aspects of the present techniques, which are described and/or claimed below. This discussion is believed to be helpful in providing the reader with background information to facilitate a better understanding of the various aspects of the present techniques. Accordingly, it should be understood that these statements are to be read in this light, and not as admissions of prior art.

Chemical plants and refineries, hereinafter referred to as plants, often work with materials that may be explosive, flammable or toxic. The atmospheric discharge of these gases may be undesirable. To dispose of these gases without atmospheric discharge, most plants use a flare to combust or otherwise destroy the gases.

Flares are typically tall stacks located in a remote area in plants. Flares generally have a flame located at the tip for burning waste gas. Flare systems typically include the flare and the associated piping coupling the flare to vessels in the plants. Gases that may be discharged from process vessels within the plant are typically carried by the piping of the flare system to the flare. The gas is burned in the flame at the top of the flare stack, avoiding the free discharge of the gas into the atmosphere.

The flame of a flare system is typically kept continuously burning at the tip of the flare to ignite or destroy any gases that are pushed from the system to the flare. To keep this flame burning and to prevent stagnant areas in the flair header, a substantial amount of flammable gas is fed into the flare system. This flammable gas may be a mixture of methane and other light hydrocarbons termed fuel gas. The fuel gas increases the energy content of the gas in the flare system to offset any non-flammable gases, such as nitrogen, that have also been discharged to the flare. Generally, a minimum energy content of 300 British Thermal Units per standard cubic feet (BTU/SCF) of gas combusted by the flare is maintained to comply with regulations that permit a plant to assume a 98% efficiency for the burn.

The mixture of fuel gas with the other gases discharged from the process into the flare system may be termed flare gas. Flare gas may include gases, vapors, vaporizing liquid and so on, and may represent a significant energy loss for a plant. Accordingly, techniques to recover this energy may provide savings for a chemical plant.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A flare system may represent a significant loss of energy in a plant, primarily due to the fuel gas used to keep the energy content of the flare gas sufficiently high to ensure efficient burning of process gases input to the flare header system. More efficient methods for disposing of flare gas would provide significant environmental, energy and cost benefits.

Figure 1:
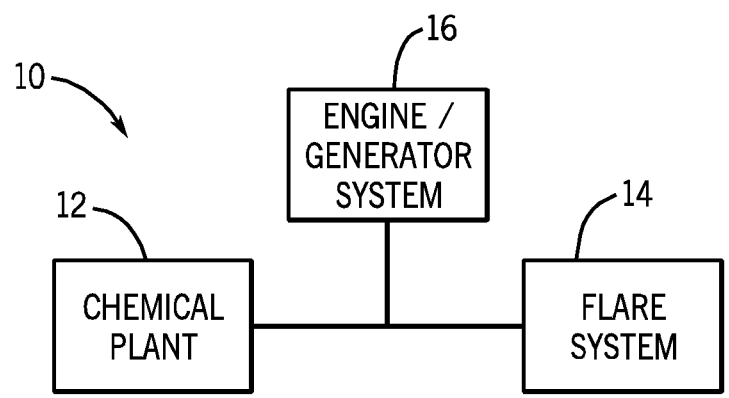
FIG. 1 is a schematic diagram of a system that diverts a portion of a flare gas from a flare system in a chemical plant to run an engine generator package, in accordance with embodiments.

The present techniques include systems and methods that recapture energy from a flare gas, while efficiently disposing of the flare gas. An overview of this type of system may be illustrated by the block diagram of FIG. 1, which illustrates a plant system 10 configured for power generation. In the plant system 10, a chemical plant 12 has a fluidic coupling to a flare system 14 for the disposal of waste gases, such as a sweep gas used to push waste gases to the flare system 14. An engine/generator system 16 may be connected to the fluidic coupling between the chemical plant 12 and the flare system 14. Part or almost all of the flare gas may then be diverted to the engine/generator system 16 where it is burned and used to generate power. For example, the engine/generator system 16 may use generator sets, compressors, pumps, batteries and the like to provide or store the power. The exhaust from the engine/generator system 16 may be sent to a catalytic converter to further decrease the emissions.

The use of the flare gas for energy generation may reduce the amount of unburned hydrocarbons discharged to the atmosphere and capture energy that otherwise would be lost if the hydrocarbons were combusted in a flare. Further, the power provided to the plant may decrease the emissions that would have come from other generation facilities, such as a power plant.

While the generated power may be used to offset immediate energy demand from the plant, alternatively, the generated energy may be stored for later use. For example, power generated at night could be used to offset higher cost power during daytime operations. Storage of the power may be implemented by storing compressed gases, by pumping water into elevated reservoirs, or by charging battery banks.

The Hot Flare System

Figure 2:
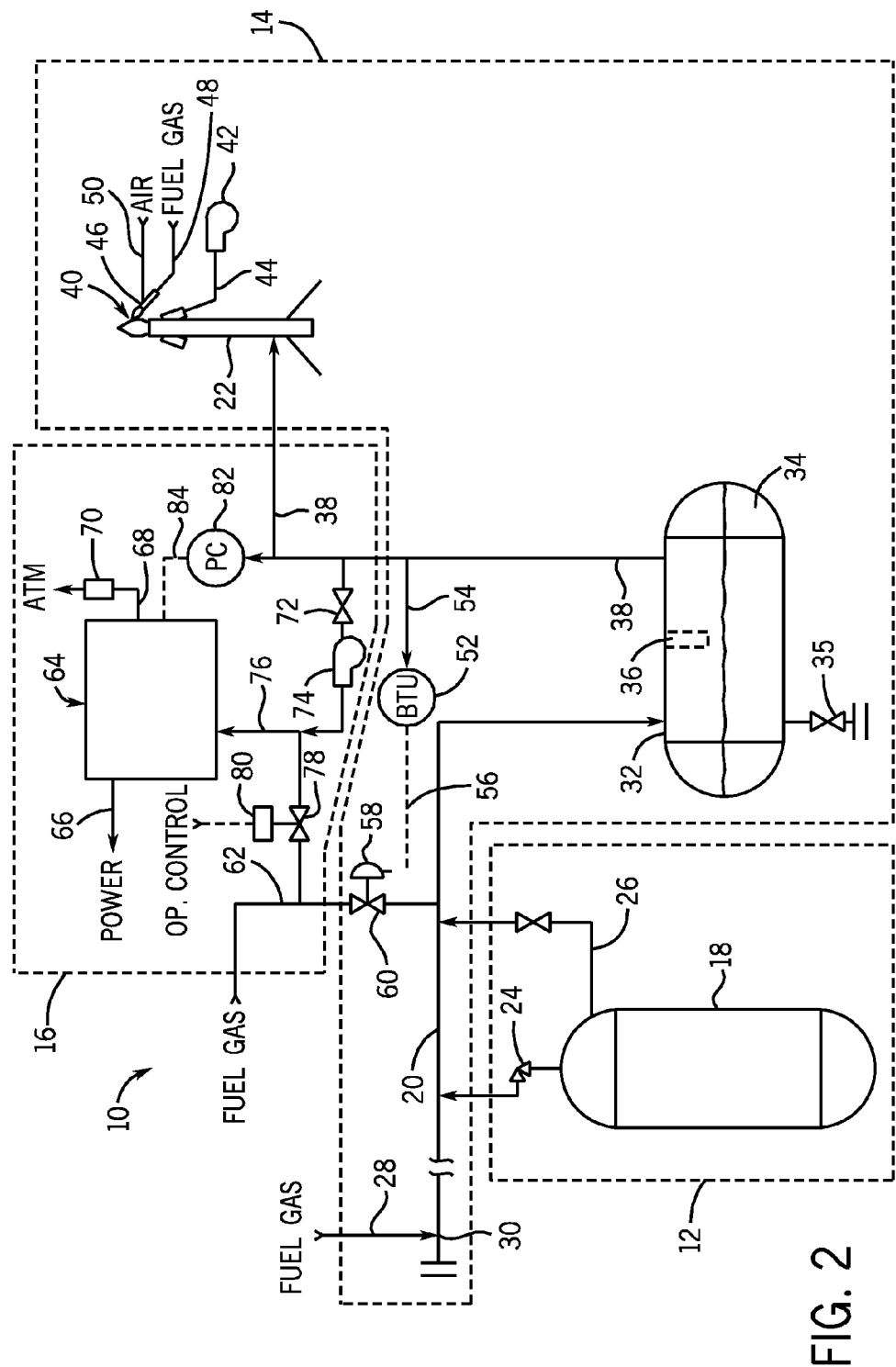
FIG. 2 is a drawing of a flare system that diverts a portion of the flare gas to power an energy generation system, in accordance with an embodiment of the present techniques.

A more detailed view of the plant system 10 is shown in the flow diagram of FIG. 2. In the plant system 10, which may be termed a hot flare system, only part of the flare gas is diverted, leaving a portion of the gas to be burned in the flare. In the plant system 10, one or more process vessels 18 in the chemical plant 12 may be coupled to a flare header 20. The flare header 20 collects gases discharged from the process vessels 18 and routes the gases to the flare 22 for combustion. Generally, pressure differential provides a motive force for the gases in the flare header 20. The chemical plant 12 may include chemical production facilities, such as polyolefin polymerization plants, or refineries, among others. Accordingly, the process vessels 18 may include reactors, cracking units, storage vessels, extruder vent domes, or any number of other process units that may vent or relieve to a flare system 14.

The process vessel 18 may be coupled to the flare header 20 via a process safety valve (PSV) 24, which protects the vessel 18 from overpressure. In what is typically an abnormal (non-routine) or upset condition, the pressure in the vessel 18 may exceed a desired or specified amount, and the PSV 24 will open, discharging gas and fluid from the vessel 18 and relieving (lowering) the pressure in vessel 18. The PSV 24 may close after the pressure in vessel 18 is lowered a sufficient amount.

The use of advanced control systems may make non-routine discharges less frequent, and thus the majority of the gas burned in the flare may be from routine discharges, such as through flare bypass lines 26, purge valves, leaks, and so on. Gas or fluids discharged from process vessels 18 into the flare header 20 may include nitrogen (e.g., used to purge the vessel 18), hydrocarbons, and other materials. The composition of such routine discharges in a typical polyolefin production process, in which embodiments of the present techniques may be applicable, are described in detail below.

A fuel gas line 28 may be connected to a point 30 on the flare header 20 that is remote from the flare 22. The fuel gas, which may be, for example, methane or a blend of light hydrocarbons, may be used to push material through the flare header 20, helping to convey the materials to the flare 22. Accordingly, this fuel gas may be termed sweep gas. The sweep gas may represent a significant source of energy lost in the flare system 10. The sweep gas may also increase the combustible content of the stream to the flare header 20 to improve combustion at the flare 22.

The flare header 20 connects to a flare knockout drum 32, which traps liquids 34 and prevents or reduces carryover of the liquids 34 to the flare 22. The flare knockout drum 32 may have a cleanout port 35 to enable the liquids 34 to be drained. The flare knockout drum 32 may also have one or more weirs 36, or other internal structures, to lower the probability of entrained liquids being carried to the flare. A flare feed header 38 carries the gas from the top of the flare knockout drum 32 to the flare 22, where it is burned in the flame 40 at the tip.

To help the flame 40 burn the gas efficiently and without substantial smoke, a blower 42 may be used to provide a steady stream of air 44 for mixture with the hydrocarbons at the flame 40. Typically, a pilot 46 is continuously lit and acts a source of ignition if the energy content of the gas at the flare 22 drop too low to maintain the flame 40. The pilot 46 may have an independent source of pilot gas 48 (fuel gas) and air 50.

Further, the energy content of the gas in the flare system 14 may be continuously monitored. If the energy content falls too low to maintain an effective flame, extra fuel gas, beyond the amount added as sweep gas, may be added to the flare system 14. The monitoring may be performed using a BTU analyzer 52, which has an inlet tap 54 connected to one of the flare headers 20 or 38. A stream of gas from the flare header 20 or 38 is pulled into the BTU analyzer 52 through this inlet tap 54, where the energy content (i.e., amount of BTU's per unit of gas) is determined. A control line 56 coupled from the BTU analyzer 52 to an actuator 58 on a valve 60 may be used to adjust the position of the valve 60, facilitating control of the flow of fuel gas from a fuel gas line 62 into the flare headers 20 and 38.

In addition to the components of a flare system 14 described above, FIG. 2 depicts the engine/generator system 16, which may include an engine/generator package 64. The engine/generator package 64 may generate power 66 by burning the gas from the flare feed header 38. The engine/generator 64 may include two basic parts. The first is an engine, which may include any number of different machines used for the recovery of heat energy by burning a flammable gas. For example, the engine may be a reciprocating internal combustion engine, a gas turbine, a burner, or any number of other systems. Further, the flare gas may provide the only fuel burned in the engine, or may be mixed with a higher quality fuel source in order to decrease variations in power output as the fuel quality in the flare header varies. Generally, the engine/generator package 64 may be adapted to burn a low quality or low BTU fuel. An example of such as engine/generator package 64 is the reciprocating engine discussed below.

Figure 6:
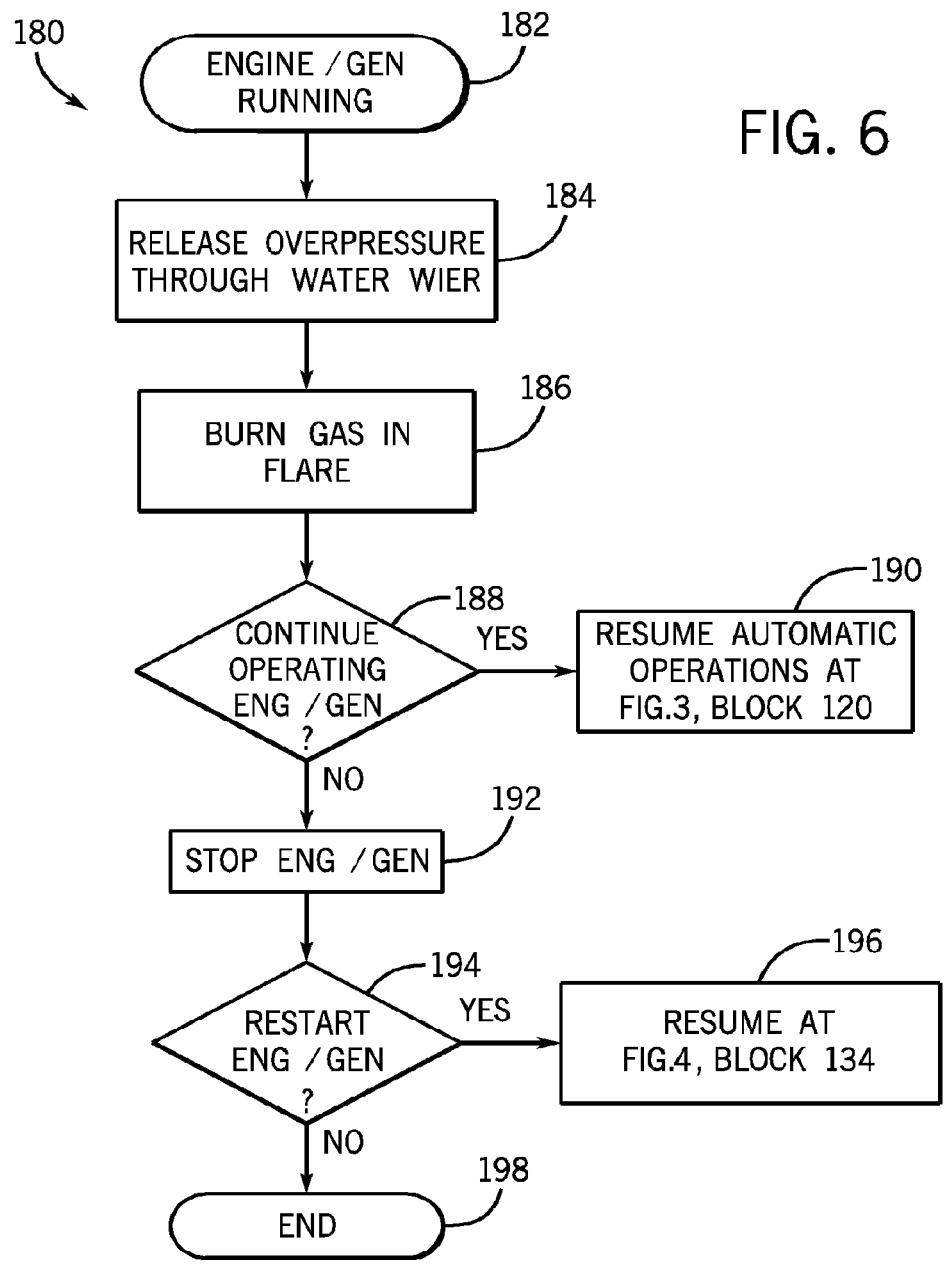
FIG. 6 is a flow chart showing operation of a flare gas generation system during overpressure situations, in accordance with an embodiment of the present techniques.

The engine/generator package 64 will generally have a limit on the amount of flare gas that may be burned. In the event that too much flare gas is released from a process vessel to be burned by the engine/generator package 64, the excess gas discharged may be burned in the flare 22. For example, a sequence of events that may take place in the event of an excess gas discharge is shown in the flow chart of FIG. 6. As for FIG. 6, this procedure 180 may begin with stable operations of the engine/generator package 64, as shown in block 182. In the case of a large volume or high-pressure discharge, the gas will be discharged through the inlet pipe 96, (i.e., dip tube) in the vessel 92 and liquid weir 94, as shown in block 184. As shown in block 186, the gas will be ignited by the flare pilot burner 46, which generally remains lit at all times.

The second part of the engine/generator package 64 is a power generator which may include an electrical generator or a compressor coupled mechanically to a shaft of the engine. Alternatively, the power generator may be a boiler that generates steam for use in the plant or in turbine generators. The exhaust 68 from the engine may be further processed in a treatment unit 70 before being discharged to the atmosphere. The treatment unit 70 may include catalytic converters, particle traps, or any number of other pollution control systems, including suitable combinations thereof.

A valve 72 may isolate the engine/generator package 64 from the flare feed header 38. Once opened, the valve 72 allows gas to flow from the flare feed header 38 into the inlet of a blower 74, where the gas is compressed. The decreased pressure at the inlet to the blower 74 provides the motive force to pull gas from the flare feed header 38 for burning in the engine/generator 64. The compressed gas discharged from the blower 74 is then pushed into the inlet line 76 of the engine/generator package 64. A valve 78 with an actuator 80 may allow an additional amount of fuel gas to be introduced into the inlet line 76 from the fuel gas line 62. The introduction of pure fuel gas into the inlet line 76 may be beneficial during startup of the engine/generator package 64. During normal operations, this valve 78 may be closed, allowing the engine to run off the gases pulled from the flare feed header 38.

The speed of the engine/generator package 64 may be controlled by the pressure in the flare headers 20 and 38, as also discussed with respect to FIG. 5, below. A pressure controller 82 monitors the pressure in the flare headers 20 and 38. The pressure controller 82 may have a control connection 84 to the speed control of the engine/generator package 64, increasing the speed when the pressure in the flare headers 20 and 38 increases, and decreasing the speed when the pressure in the flare headers 20 and 38 decreases. During normal operation, the gases from the flare headers 20 and 38 are burned in the engine/generator package 64 which is used to generate power 66.

In the embodiment discussed with respect to FIG. 2, no obstruction is placed in the flare feed line 38 between the flare knockout drum 32 and the flare 22. Accordingly, the total amount of gas burned in the engine/generator package 64 may be carefully controlled to prevent the flame 40 from being extinguished. Further, if the pressure at the blower 74 inlet is reduced too far, air may be aspirated into the flare 22, with a possibility of undesirably creating a combustible atmosphere in the flare 22 (below the tip of the flare 22) or in the flare feed header 38. A spill back line with control valve and cooling (not shown) may be used to prevent low suction pressure to the blower 74. This spill back line may prevent formation of a vacuum at the inlet, which could lead to air infiltration into the inlet line 76 and the potential formation of a flammable mixture in the inlet line 76. At higher pressures automation of valve 72 may allow it to control the inlet pressure to blower 74 at an acceptable level. Alternatively, the need for precise control, or a spill back line, may be decreased by isolating the flare 22 from the flare feed header 38 with flow into the flare 22 only during startup or a large discharge from the process.

The Cold Flare System

Figure 3:
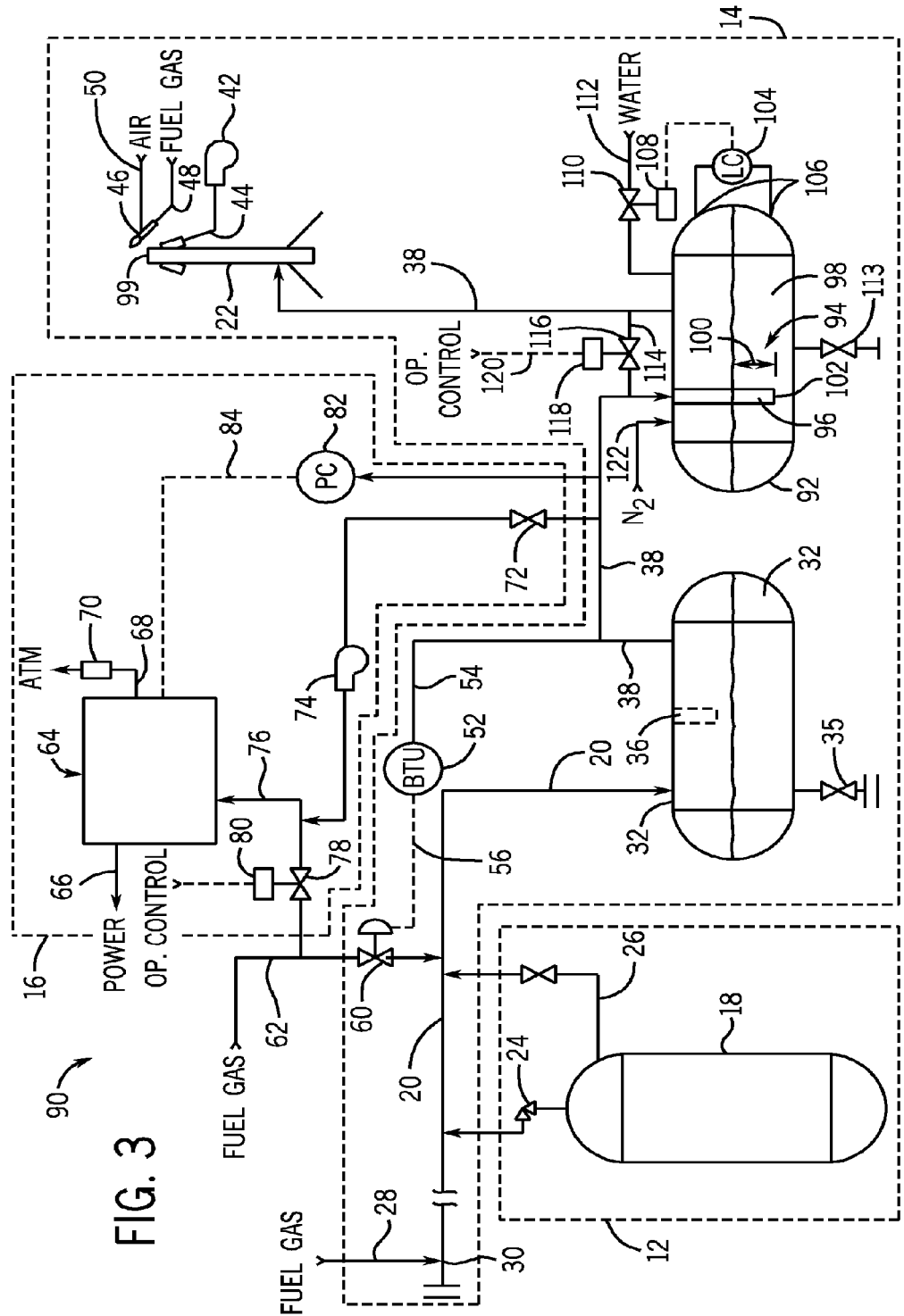
FIG. 3 is a drawing of a flare system that diverts almost all of the flare gas to power an energy generation system, while keeping the flare in a cold standby status, in accordance with an embodiment of the present techniques.

Another presently contemplated embodiment of a system that may be useful for recovering energy from a flare gas stream is shown in the piping drawing of FIG. 3. In this system, which may be termed a cold flare system 90, substantially all of the flare gas from normal operations is diverted to the engine/generator package 64, with only the pilot burner 46 normally lit at the tip of the flare 22. As discussed below, a vessel 92 having a liquid weir 94 (e.g. water) may be disposed in the flare feed header 38 between the flare knockout drum 32 and the flare 22 to facilitate control of pressure in the cold flare system 90 during high volume discharges from the process. Other equipment is similar to that discussed with respect to FIG. 2, above.

In the vessel 92, an inlet pipe 96 from the flare feed header 38 extends below the surface of the water 98 of the liquid weir 94. The water level 100 above the opening 102 of the inlet pipe 96 is used to control the maximum pressure of the cold flare system 90. If this maximum pressure is exceeded, for example, by a large gas discharge or by the powering down of the engine/generator package 64, the gas pushes out of the inlet pipe 96, bubbles through the water 98, and travels to the flare 22. The gas is then ignited at the tip 99 of the flare 22 by the pilot burner 46. The water level 100 above the opening 102 in the inlet pipe 96 and, thus, the maximum pressure in the flare system 90, is maintained by a level controller 104, which measures the differential pressure between two points 106 on the vessel 92. The level controller 104 is connected to an actuator 108, which may control a valve 110 on a water line 112 connected to the vessel 92. The level controller 104 opens the valve 110 when the water level 100 drops too low, allowing water to flow into the vessel 92 until the water level 100 is restored. Further, the vessel 92 may have a drain valve 113 to lower the water level 100, or to remove all of the water from the vessel 92. The liquid weir 94 may be combined with the flare knock out tank 32 or any number of other designs incorporating a liquid weir 94 may be used.

A bypass line 114 may be connected across the inlet and outlet lines to the vessel 92. A valve 116 mounted in the bypass line 114 may have an actuator 118 to allow the vessel 92 to be remotely bypassed under operator control, as indicated by reference numeral 120, before startup of the engine/generator package 64. Finally, a nitrogen line 122 may be connected to the vessel 92 to maintain a small nitrogen purge through the vessel 92, the flare feed header line 38 and out the tip 99 of the flare 22 to ensure that an inert atmosphere is present through the piping downstream of the vessel 92.

Operational Procedures for the Cold Flare System

Figure 4:
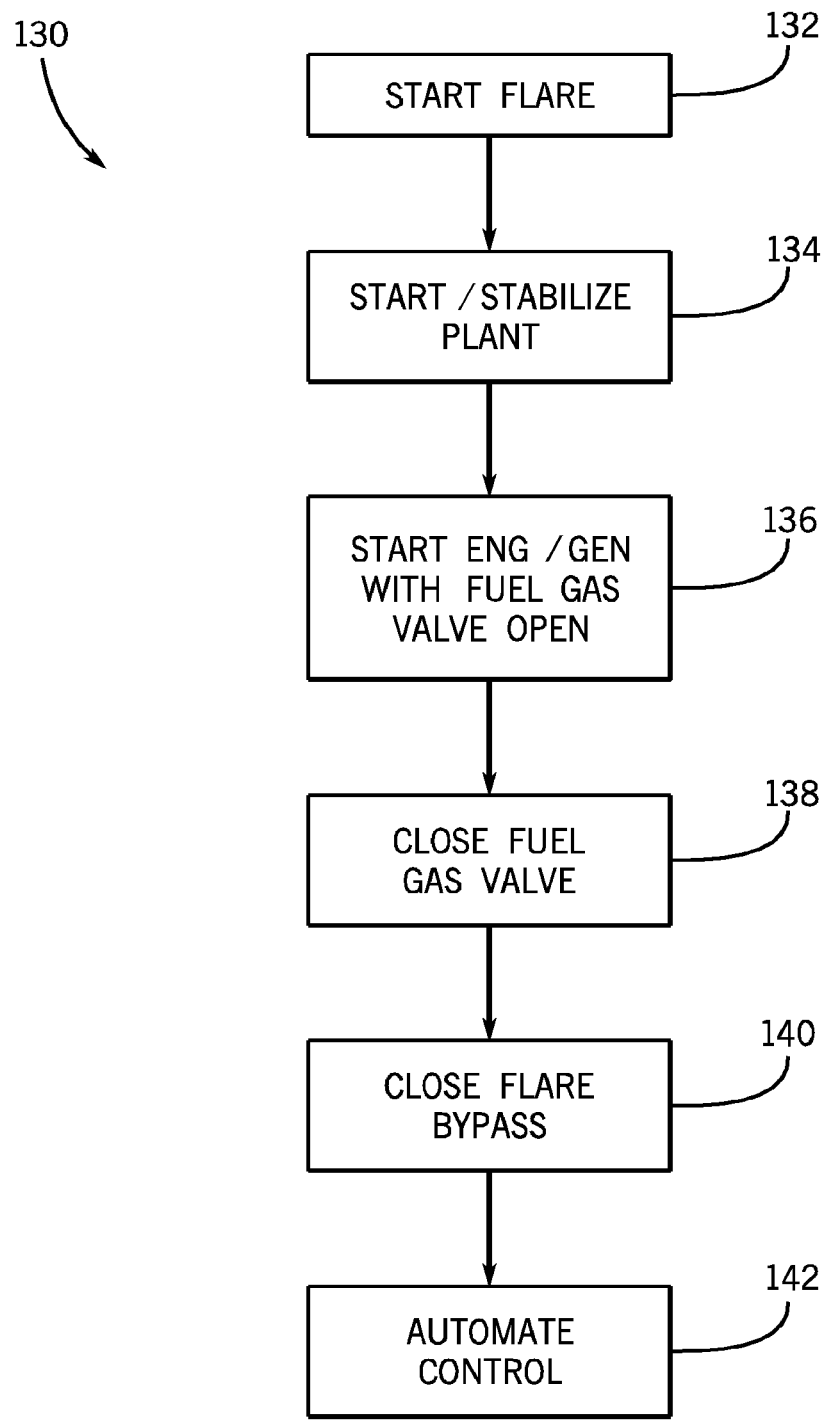
FIG. 4 is a flow chart showing a start up procedure for a flare gas generation system, in accordance with an embodiment of the present techniques.

FIG. 4 is a flow chart illustrating an example of a procedure 130 that may be used for starting up the cold flare system 90, in accordance with embodiments of the present techniques. Referring also to FIG. 3, block 132 of FIG. 4 shows that the flare system 14 may be started with the bypass valve 116 in the open position. Alternatively, the flare system 14 may be started with the vessel 92 empty or having level of water below the pipe 96. Starting the flare system 14 may include purging the flare headers 20 and 38 to eliminate oxygen and then igniting the flare pilot burner 46. Once the pilot burner 46 is operating, the sweep gas line 28 may be opened to the flare system to start a flow of flammable flare gas to the flare 22.

Once the flare system 14 is operational, the plant 12 may be started up and stable operations achieved, as shown in block 134. This will involve many different steps which will depend on the type and size of the plant, among other factors. Once the operation of the plant 14 is stable, the engine/generator package 64 may be started.

The engine/generator package 64 may be started with the fuel gas valve 78 open to provide a high energy content fuel to the engine for startup, as shown in block 136. Next, the engine/generator package 64 may be slowly switched to flare gas by starting blower 74 and closing the fuel gas valve 78, as shown in block 138. At this time the engine/generator package 64 would be operated at a slow speed and consume less than all of the flare gas in the header leaving the main flame burning as described in the hot flare case. As shown in block 140, after the engine/generator package 64 is running and the flare pressure is low, the bypass valve 116 may be closed, or water added to the vessel 92 from line 112, until the flame of the flare 22 is extinguished, after which substantially all of the flare gas may be diverted to the engine/generator package 64. When the bypass valve 116 is closed, or the water level 100 increased above the inlet pipe 96, the engine/generator package 64 is burning all of the flare gas and control of the cold flare system 90 may be placed under automatic control, as shown in block 142.

Figure 5:
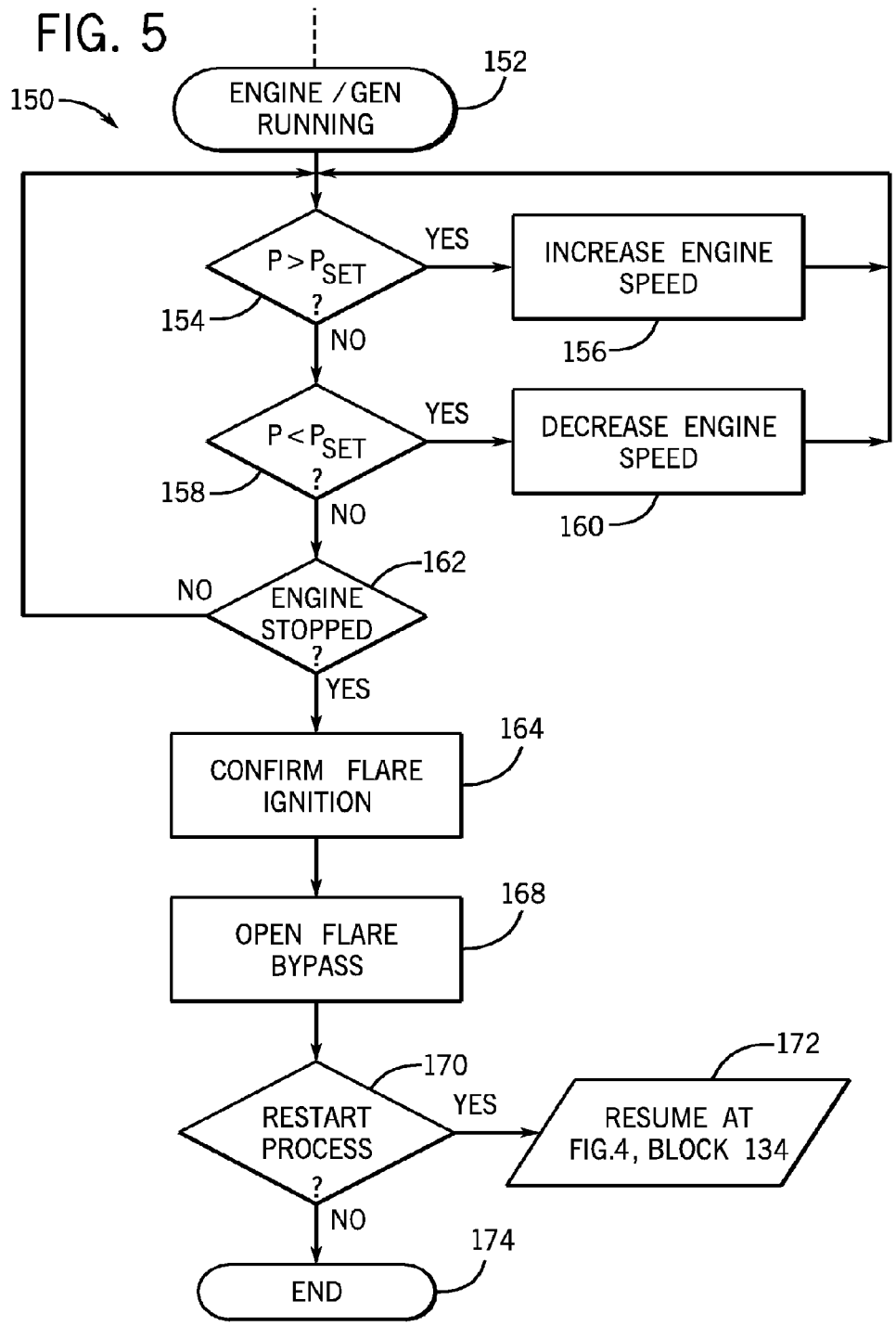
FIG. 5 is a flow chart showing a control scheme for the engine in the flare gas generation system, in accordance with an embodiment of the present techniques.

An example of a procedure 150 that may be used to control the engine/generator package 64 during normal operation of the cold flare system 90 is shown in the block diagram of FIG. 5. As shown in block 152, the procedure 150 begins with the engine/generator package 64 running in a stable condition. The pressure of the flare system 14 may then be used to control the speed of the engine/generator package 64. As shown in block 154, if the pressure of the flare system 14 has increased beyond a previously entered setpoint, the engine speed may be increased, as shown in block 156, to burn more of the flare gas. If the flare pressure has decreased below a previously entered setpoint, as shown in block 158, the engine speed may be decreased, as shown in block 160, to lower the amount of fuel gas burned. After each change in engine speed, control resumes after block 152.

More complex control schemes may be used to control the speed of the engine/generator package 64, and thus the pressure in the flare system 14. For example, a proportional-integral-derivative (PID) controller may use the pressure in the flare system as an input and the speed of the engine/generator package 64 as an output. When appropriately tuned, such a PID controller would continuously adjust the speed of the engine/generator package 64 based on the pressure in the flare system 14, increasing or decreasing the engine speed to keep the flare pressure constant. More advanced control systems, such as fuzzy logic schemes, may be desirable for controlling the engine speed based on the flare pressure, as these schemes may have lower incremental variations in power output.

For example, in a fuzzy logic control scheme the pressure in the flare system 14 would be allowed to vary within small tunable ranges, with the engine speed varied in a step-wise fashion depending on the current pressure range. If the pressure enters a higher pressure range, for example, the engine speed may be slightly increased, e.g. incrementally stepped up, to burn more flare gas and thus lower the pressure in the flare system 14. Conversely, if the pressure enters a lower range, the engine speed may be slightly decreased, e.g. incrementally stepped down, to allow the pressure in the flare system 14 to increase. Furthermore, feed forward inputs from flare pressure sensors, or operators of the equipment connected to the flare, could be used to control the engine/generator package 64 or put it in a safe mode if a large discharge to the flare header occurs.

Any number of combined control schemes may be used. For example, a fuzzy logic control scheme may be combined with a PID controller, where the PID controller provides small, smooth changes in the speed of the engine/generator package 64, while the fuzzy logic scheme may prevent overshoot of the PID controller which could lead to oscillation of the engine speed and, thus, variations in power output.

If the engine/generator package 64 has stopped running, as shown in block 162, a number of procedures may be automatically or manually implemented to prepare for return to normal operation. As shown in block 164, the ignition status of the flare 22 may be confirmed to ensure that any discharged gases will be burned. This may be performed by a visual check of the status of the flare pilot burner 46 by an operator, for example, by using a camera image to ensure the burner 46 is lit. Other techniques, such as a measuring heat with a temperature sensor (thermocouple) disposed at the burner 46 may be used to automatically ensure the flare pilot burner 46 is lit. A combination of these techniques may also be used. If the flare pilot burner 46 is not lit, it may be ignited prior to the gas reaching the tip 99. Any number of techniques may be used to ignite the flare 22. For example, a remote igniter (not shown) may be used to provide a spark, igniting the pilot burner 46.

Once the ignition status of the flare 22 has been confirmed, the flare bypass valve 116 may be opened, or the drain valve 113 opened to discharge water 98, as shown in block 168, allowing flare gas to flow directly to the flare 22, which may lower the pressure in the cold flare system 90. The flare gas may then be ignited by the flare pilot burner 46 at the tip 99 of the flare 22 and subsequently be combusted. As shown in block 170, a determination may be made to restart the process. If the decision is made to resume as shown in block 172, the procedure restarts with the acts at block 134, as discussed with respect to FIG. 4. If not resumed, the process ends at block 174.

The engine/generator package 64 will generally have a limit on the amount of flare gas that may be burned. In the event that too much flare gas is released from a process vessel to be burned by the engine/generator package 64, the excess gas discharged may be burned in the flare 22. For example, a sequence of events that may take place in the event of an excess gas discharge is shown in the flow chart of FIG. 6. As for FIG. 6, this procedure 180 may begin with stable operations of the engine/generator package 64, as shown in block 182. In the case of a large volume or high-pressure discharge, the gas will be discharged through the inlet pipe 96, (i.e., dip tube) in the vessel 92 and liquid weir 94, as shown in block 184. As shown in block 186, the gas will be ignited by the flare pilot burner 46, which generally remains lit at all times.

The overpressure may result in the engine/generator package 64 running at full speed, as discussed with respect to FIG. 5. In block 188, the plant operator may be asked if the engine/generator package 64 may continue to operate. The engine/generator package 64 may be stopped for any number of reasons, for example, to stabilize plant operations without causing variations in the power levels, among others. If the discharge is transient or non-critical, as shown in block 190, the engine/generator package 64 may be left running in automatic operation to burn as much of the flare gas as possible, with any excess gas over the capacity of the engine/generator package 64, consumed in the flare 22. However, the engine/generator package 64 may be stopped, as shown in block 192. If the engine/generator package 64 is stopped, in block 194, a decision may be made to restart the engine. If the engine/generator package 64 is to be restarted, in block 196 the process would then resume with the acts starting in block 134, discussed with respect to FIG. 4. If the process is not restarted it ends in block 198.

Exemplary System Used in a Polyolefin Plant

As discussed above, the energy reclamation system 10 of the present techniques may be used with any number of different chemical plants 12, including chemical production facilities and refineries. For example, without limiting the applicability of the current techniques to any one type of plant, a presently contemplated embodiment of the current techniques may be used to recover energy from flare gas in a polyolefin production process. An exemplary manufacturing process 200 for producing polyolefins, such as polyethylene homopolymer, polypropylene homopolymer, and/or their copolymers, is depicted in the block diagram in FIG. 7. Each step in the process may have routine discharges that are sent to the flare system 14, as discussed below. Non-routine feeds are not specifically detailed, but may include both flammable and non-flammable materials, for example, nitrogen used to purge hydrocarbons from vessels, or gases and liquids from overpressure discharges, among others. As described above with respect to FIG. 6, such non-routine discharge may be sent to a flare system 14 for ignition or may be burned in an engine/generator system 16 for energy recovery.

Figure 7:
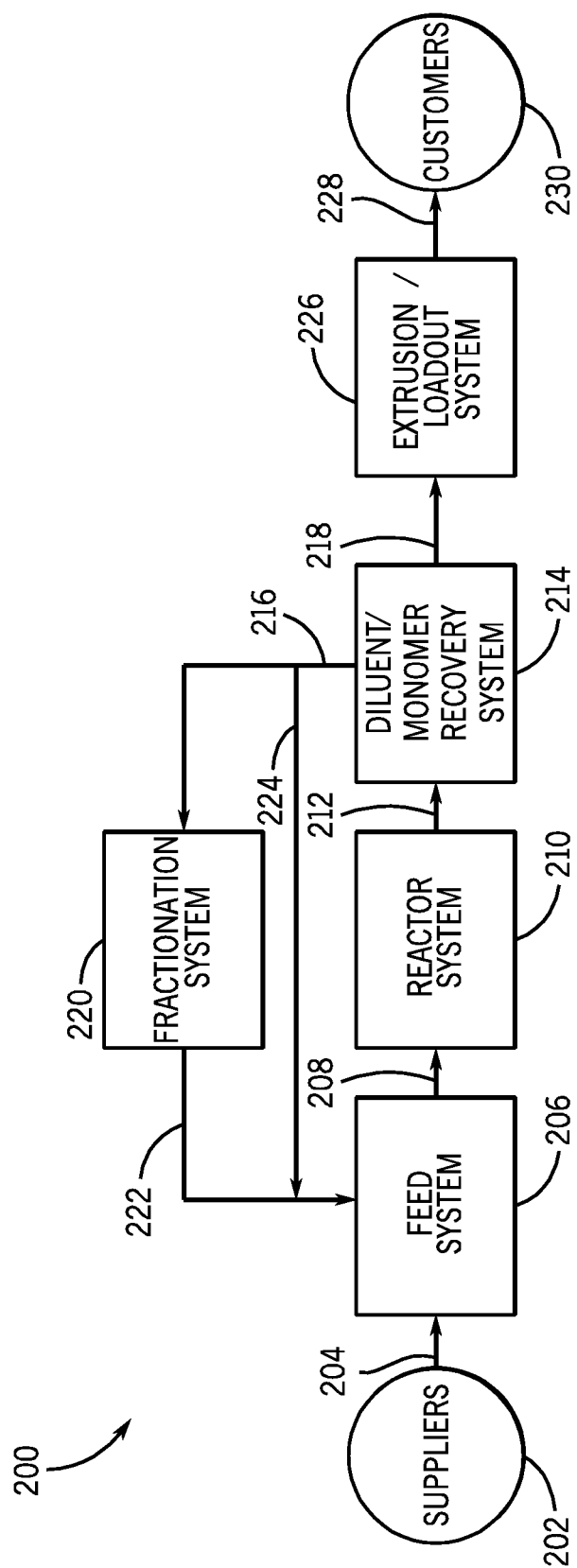
FIG. 7 is a block diagram of a polyolefin production process, in accordance with an embodiment of the present techniques.

As shown in FIG. 7, various suppliers 202 may provide reactor feedstocks 204 to the manufacturing system 200 via pipelines, trucks, cylinders, drums, and so forth. The suppliers 202 may include off-site and/or on-site facilities, such as, for example, olefin plants, refineries, catalyst plants, and the like. Examples of possible feedstocks 204 include olefin monomers and comonomers (such as ethylene, propylene, butene, hexene, octene, and decene), diluents (such as propane, butane, isobutane, hexane, heptane and their isomers or mixtures), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. Hydrocarbons and nitrogen may be discharged to the flare from various points in the shipping and storage of feedstocks 204, for example, purging lines free of hydrocarbons after use, or clearing storage vessels for service, among others.

The feedstocks 204 are provided to a reactor feed system 206, where they may be stored, such as in monomer storage and feed tanks, diluent vessels, catalyst tanks, co-catalyst cylinders and tanks, and so forth. In the feed system 206 the feedstocks 204 may be treated or processed prior to their introduction as feed 208 to the reactor system 210. For example, feedstocks 204, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. Gaseous catalyst poisons, separated from the feedstocks in the treatment process, may be sent to the flare system 14 as a routine discharge. The olefin monomer and comonomers may be a liquid, a gaseous, or a supercritical fluid, depending on the type of reactor being fed. Also, typically only a relatively small amount of fresh make-up diluent as feedstock 204 may be added, with a majority of the diluent fed to reactor system 210 recovered from the reactor effluent.

The reactor system 210 may include one or more polymerization reactor vessels, such as with solid polymer dispersed in a continuous liquid-phase, gas-phase or, supercritical or a polymer liquid dissolved or dispersed in a liquid. In some cases, the reactor system 210 may include combinations of liquid and gas-phase reactors, as well as combinations of multiple liquid or multiple gas phase reactors. If multiple reactors make up the reactor system 210, the reactors may be arranged in series, in parallel, or in any other suitable combination or configuration. Generally, routine discharges from the reactors to the flare system 14 are not expected.

In the polymerization reactor vessels, one or more olefin monomers are polymerized to form a product including polymer particulates, typically called fluff. The fluff may possess one or more melt, physical, rheological, and/or mechanical properties of interest, such as density, melt index (MI), melt flow rate (MFR), copolymer or comonomer content, modulus, and crystallinity. One or more catalysts that facilitate polymerization of the monomer are typically added to the polymerization reactor vessels. The catalyst or catalysts may be selected to achieve the desired fluff properties for each component polymer in the multi-modal resin. Further, the reaction conditions, such as temperature, pressure, flow rate, mechanical agitation, product takeoff, component concentrations, polymer production rate, and so forth, may also be selected to achieve the desired properties.

If the reactor or reactors are liquid-phase, a diluent is typically fed into the reactor. The diluent may be an inert hydrocarbon that is a liquid at reaction conditions, such as isobutane, propane, n-pentane, i-pentane, neopentane, n-hexane, cyclohexane, cyclopentane, methylcyclopentane, ethylcyclohexane, and the like. A purpose of the diluent is generally to suspend the catalyst particles and polymer within the reactor (e.g., in the circulation of the polymer slurry in a loop reactor). The diluent also is present to transport the heat discharged from the polymerization reaction to the reactors cooling surfaces.

The discharge 212 of the reactors within the reactor system 210 may include the polymer fluff as well as non-polymer components, such as diluent, unreacted monomer/comonomer, and residual catalyst. The discharge 212 may be subsequently processed, such as by a diluent/monomer recovery system 214, to separate non-polymer components 216 (e.g., diluent and unreacted monomer) from the polymer fluff 218. The diluent/monomer recovery system 214 may have a low-pressure recovery flash of the diluent/monomer with an associated recycle compression or may eliminate this process step using only a high-pressure flash.

With or without the low pressure flash, the untreated recovered non-polymer components 216 may be further processed, such as by a fractionation system 220, to remove undesirable heavy and light components. The fractionation system 220 may be a significant source of routine discharges to a flare system as non-reactive components may be removed from the non-polymer components 216 prior to their being returned to the feed system 206 for use as feed 208 to the reactor system 210. For example, removal of ethane from the non-polymer components 216 prevents its buildup in the reactor system 210. The ethane is routinely discharged into the flare for disposal. Further, small amounts of hexane and hexene may also be discharged to the flare system 90 from the fractionation system 220 in order to prevent these compounds from building up in the non-polymer components 216. Other components may also be discharged into the flare system 14, including nitrogen, among others.

Fractionated product streams 222 may then be returned to the reactor system 210 via the feed system 206. On the other hand, the non-polymer components 216 may recycle more directly to the feed system 206 (as indicated by reference numeral 224), bypassing the fractionation system 220, and thus avoiding the energy consumption of the fractionation system 220. Indeed, in certain embodiments, up to 50-95% of the diluent discharged from the reactor bypasses the fractionation system 220 in route to the reactor system 210. The direct recycle feed carries non-reactive components back to the reactor, and is not a source of discharge to the flare system 14.

Also in the diluent recovery area 214, the product polymer fluff is typically purged with nitrogen or other inert gases to remove hydrocarbon diluent, monomers and other components from the fluff. The purging may reduce the residuals in the polymer fluff to low levels before extrusion in system 226 so that end users of the product are not exposed to residual hydrocarbons. The nitrogen and hydrocarbon mixture from the purging is typically sent to a recovery system (not shown), where most of the hydrocarbons are recycled back to the reactor via stream 216 and some of the nitrogen can be recycled back to the purge system. To prevent build up of ethane and ethylene in the recovered nitrogen, a portion of the recovered nitrogen is sent to the flare header 20 for its disposal. This may be another significant source of routine discharges to a flare system 14.

In the extrusion/loadout systems 226, the fluff 218 is typically extruded to produce polymer pellets 228 with the desired mechanical, physical, and melt characteristics. In general, the polyolefin pellets may then be transported to a product load-out area where the pellets may be stored, blended with other pellets, and/or loaded into railcars, trucks, bags, and so forth, for distribution to customers 230.

In an exemplary large polyolefin facility, as described above, the flow of gases to the flare system 14 may average about 5000 lbs/hour or about 68,000 standard cubic feet per hour. At an average heating value of about 455 BTU/SCF, this corresponds to about 30 million BTU/hour. The flow of gases to the flare system 14 is not limited to these amounts. Depending on the size of the plant, the discharge may be much lower or much greater. For example, in a small plant, the flow of gases to the flare system 14 may be 2000 lbs/hour, 1000 lbs/hour, 500 lbs/hour, or even less. In contrast, in large plants the flow of gases to the flare may be 10,000 lbs/hour, 20,000 lbs/hour, 60,000 lbs/hour or even higher. As the use of multiple flare headers may be common in large plants, multiple energy recovery devices may be used.

The amount of gases flowing to the flare system 14 may influence the selection of the engine/generator 64. For example, for a larger plant, a burner used to generate steam for plant utilities or secondary power generation may be more efficient than other options. Alternatively, for the smaller systems, a reciprocating engine powering an electric generator or compressor may be selected.

For example, an engine/generator package 64 that may be used in presently contemplated embodiments of the present techniques uses a reciprocating engine and may be available from Cummins Power Generation. This engine/generator package 64 can develop full power on fuel as dilute as 40% methane by volume, and run at reduced power at concentrations down to 30% methane by volume. One engine/generator package 64 consumes 16 million BTU/hour of fuel gas, generating about 1750 kilowatts (KW) of electricity.

Using a single engine/generator package 64 burning about 16 million BTUs/hour, as described above, around one half of the about 30 million BTUs/hour flare gas from the exemplary polyolefin plant could be consumed, generating about 1.75 megawatts (MW) of electricity. The remaining flare gas could be sent to the flare in a flare system 14 for combustion, as described with respect to FIG. 2. Further, excess gas may be compressed and stored for later combustion in the engine/generator package 64.

If further energy recapture is desirable, two engine/generator packages 64, each burning 16 million BTUs/hour could be used in conjunction with the flare system 14. As the total energy available is less than the capacity of the two engine/generator packages, the electrical power generated would be slightly less than twice 1.75 MW, with the engines running at a lower speed.

While the techniques disclosed above may be susceptible to various modifications and alternative forms, specific embodiments have been shown by way of example in the drawings. However, it should be understood that the techniques are not intended to be limited to the particular forms disclosed. Rather, the techniques encompass all modifications, equivalents and alternatives falling within the spirit and scope of the techniques as defined by the following appended claims.

What is claimed is:

1. A power generation system, comprising:
    a reciprocating engine or a burner configured to burn a low-BTU gas, wherein the low-BTU gas comprises a flare gas having an energy content greater than about 30% methane by volume;
    a chemical production plant comprising a flare system comprising the flare gas, a flare and a flare header fluidly coupling the flare to a process vessel in the chemical production plant;
    a conduit diverging from the flare header at a point between the flare and the process vessel and fluidly coupling the flare header and the reciprocating engine or the burner, wherein the conduit is configured to divert at least a portion of the flare gas from the flare header to power the reciprocating engine or the burner; and
    an energy recovery device powered by the engine or the burner.

2. The power generation system of claim 1, comprising a blower with an inlet coupled to the flare header via the conduit, and an outlet coupled to an inlet of the reciprocating engine or burner, wherein the blower is configured to boost the pressure of the flare gas before feeding the flare gas to the reciprocating engine or the burner.

3. The power generation system of claim 1, comprising a water weir coupled between the flare header and the flare, wherein the water weir is configured to divert substantially all of the flare gas to the reciprocating engine during normal operation.

4. The power generation system of claim 1, comprising a fuel source coupled to the reciprocating engine to provide fuel.

5. The power generation system of claim 4, comprising a mixing conduit configured to mix the fuel with the flare gas prior to feeding the mixture to the reciprocating engine.

* * * * *